United States Patent [19]

Ovshinsky et al.

[11] 4,226,523
[45] Oct. 7, 1980

[54] IMAGING DEVICE

[75] Inventors: Herbert C. Ovshinsky, Oak Park; Gerald F. Marshall, Grosse Pointe Woods, both of Mich.

[73] Assignee: Energy Conversion Devices, Inc., Troy, Mich.

[21] Appl. No.: 961,692

[22] Filed: Nov. 17, 1978

[51] Int. Cl.³ ............................................. G03B 27/54
[52] U.S. Cl. ........................................ 355/1; 355/67; 355/99
[58] Field of Search ................... 355/1, 67, 70, 68, 69, 355/71, 113–121, 99; 356/96.1, 96.15

[56] References Cited

U.S. PATENT DOCUMENTS

| | | | |
|---|---|---|---|
| 3,241,437 | 3/1966 | Thiels | 355/67 X |
| 3,514,200 | 5/1970 | Bowker | 355/1 |
| 3,692,994 | 9/1972 | Hirschman et al. | 355/67 X |
| 3,966,317 | 6/1976 | Wacks et al. | 355/64 X |

*Primary Examiner*—L. T. Hix
*Assistant Examiner*—W. J. Brady
*Attorney, Agent, or Firm*—Wallenstein, Spangenberg, Hattis & Strampel

[57] ABSTRACT

An imaging device for flash imaging, through an imaging mask at an imaging film plane, a dry-process imaging film having a layer of an energy dispersible image forming material on a surface thereof. The device comprises electromagnetic energy collecting means which is associated with a source of electromagnetic energy. The energy collecting means includes an energy transmitting body which directs, collimates and shapes the electromagnetic energy emitted by the energy source. The energy collecting means also includes energy intercepting and reflecting members which form a chamber in which the energy source and the energy transmitting body are at least partially encased. A housing is provided for maintaining the energy transmitting body and the energy intercepting and reflecting members in a predetermined position with relation to one another, the energy source and the imaging mask at the imaging film plane. The imaging device is especially adapted for flash imaging microfiche cards comprised of preformed areas or zones of an energy dispersible image forming material, and enables an electromagnetic energy source such as a Xenon flash tube to be operated at lower energy levels for shorter time periods thereby appreciably reducing energy costs and prolonging the useful life of the flash tube, while at the same time providing excellent image resolution in all directions in the imaging film.

14 Claims, 24 Drawing Figures

IMAGING DEVICE

The present invention relates to an imaging device for flash imaging a dry-process imaging film.

Apparatus for dry-process, flash imaging an imaging film having a layer of an energy dispersible image forming material on a surface thereof is disclosed in U.S. Pat. No. 3,966,317. The apparatus shown in the patent includes an image transferring station where a single frame on a microform film is interposed over a microimaged frame in a mask film strip positioned above a glass window. A short pulse of energy, above a threshold value, emitted by a Xenon flash tube is passed through the glass window and the microimaged frame of the mask film strip onto the frame of the microform film which, preferably, is in the form of a microfiche or microform card. The energy pulse emitted by the Xenon flash tube is absorbed and scattered by the opaque areas of the microimaged frame of the mask film strip so as not to effectively reach the corresponding areas of energy dispersible material of the overlying frame of the microform film. However, the short energy pulse readily passes through the substantially transparent areas of the microimaged frame of the mask film strip to the corresponding overlying areas of energy dispersible material of the microform film where the energy pulse is absorbed. The absorption of the energy pulse by these areas heats the energy dispersible material to at least a softened or molten condition, whereupon the continuous layer of energy dispersible material at those areas is broken up and dispersed into small and relatively widely spaced globules to make those areas substantially transparent. The dispersion of the energy dispersion material at the heated areas is occasioned, in the main, by the surface tension of the heated material which causes the heated material to form such small and spaced globules. After the globules are so formed by the short pulse of energy emitted by the Xenon flash tube, they quickly cool and remain in that globular condition to provide substantially transparent areas in the frame of the microform film.

The energy collection efficiency of the film imaging arrangement shown in U.S. Pat. No. 3,966,317 is of the order of 40%. Stated differently, approximately 60% of the energy emitted by the Xenon flash tube employed in the apparatus of the patent is dissipated and lost. As a result, it is necessary to utilize a longer pulse width at a higher operating potential to provide a sufficient amount of energy at the film plane to accomplish dispersion of the energy dispersible image forming material on the imaging film employed in conjunction with the apparatus. The need for longer pulse widths and higher operating potentials not only acts to shorten the useful life of the Xenon flash tube, but, also, has an adverse affect on the energy costs of the apparatus and on the sharpness of the images produced.

In accordance with the present invention, an imaging device has been evolved which collects, directs, collimates and shapes energy emitted by an energy source, such as a Xenon flash tube, in a manner which permits maximum utilization and optimum distribution of the energy at the film plane thereby enabling substantially uniform and instantaneous dispersion of an energy dispersible image forming material on the imaging film to be attained. The energy collection efficiency of the imaging device is upwards of 80%, or about double that of the film imaging arrangement disclosed in U.S. Pat. No. 3,966,317. The uniquely high energy collection efficiency of the device has significant economic advantages in that a shorter pulse width at a lower operating potential can be employed in those instances where a Xenon flash tube is utilized as the energy source with the result that energy costs are reduced appreciably and the useful life of the Xenon flash tube is more than doubled. These results are achieved, moreover, while providing images in the imaging film having exceptionally high resolution characteristics.

The imaging device of this invention, in brief, comprises an energy transmitting body advantageously in the form of a truncated, or frusto-pyramidal shaped, solid, elongated prism-like member. The energy transmitting body has en energy entrance facet and energy exit facet, and is positioned in proximity to an electromagnetic energy source, such as a Xenon flash tube, which is at least partly encased in energy intercepting and reflecting means. In a preferred embodiment of the imaging device, the energy intercepting and reflecting means comprises a pair of generally hemispherically shaped members, the inner surfaces of which have been coated to make them energy reflecting. The energy transmitting body, the flash tube and the hemispherically shaped members are maintained in predetermined, operative relationship with respect to one another by means of a housing comprising separable top, or cover, and bottom, or base, portions. The base portion of the housing supports the flash tube and is provided with means for connecting the flash tube to a power source for energizing the flash tube. The energy transmitting body is supported by the top, or cover, portion of the housing with its energy exit facet in a plane parallel to the plane of a dry-process imaging mask film strip interposed between the energy exit facet of the energy transmitting body and a dry-process imaging film to be imaged. While in accordance with the broader aspects of the invention the dry-process imaging film used with the device may be in the form of a microfilm strip to which microimages may be transferred, the dry-process imaging film most advantageously is in the form of a microfiche card. The device of this invention is light in weight and compactly constructed, and is especially adaptable for use in apparatus of the type shown in U.S. Pat. No. 3,966,317.

The foregoing, and other features and advantages of the imaging device will become apparent to those skilled in the art upon reference to the following description, claims and drawings in which:

Figures 1, 1A:
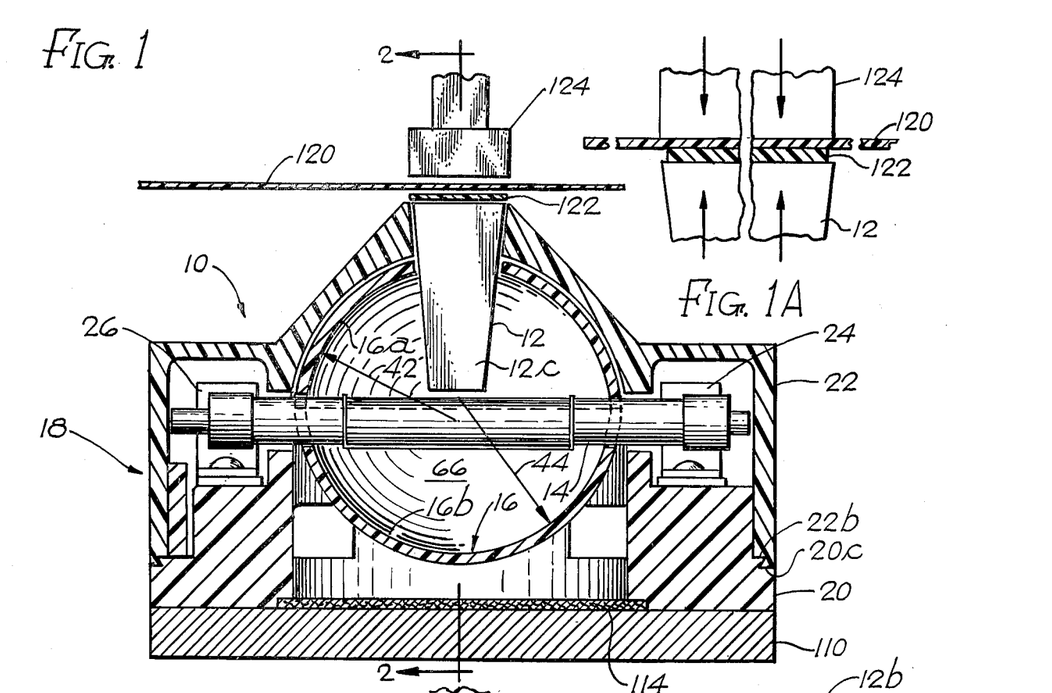
FIG. 1 is a sectional view in elevation of an embodiment of the device.
FIG. 1A is an enlarged fragmentary view partly in section, showing the imaging mask and the microfiche card in contact during imaging with the device.

The embodiment of the imaging device illustrated in FIG. 1, and designated generally at 10, includes an electromagnetic energy transmitting member or body 12, an electromagnetic energy source 14, and energy intercepting and reflecting means generally designated at 16. A housing 18, comprising a base or bottom portion 20 and a top or cover portion 22, is provided for supporting the components of the imaging device in operative relation with respect to one another. The portions 20 and 22 of the housing 18 advantageously are fabricated of an electrically non-conductive, and heat resistant plastics material such as polyethylene.

Figures 2, 3A, 3B, 3C:
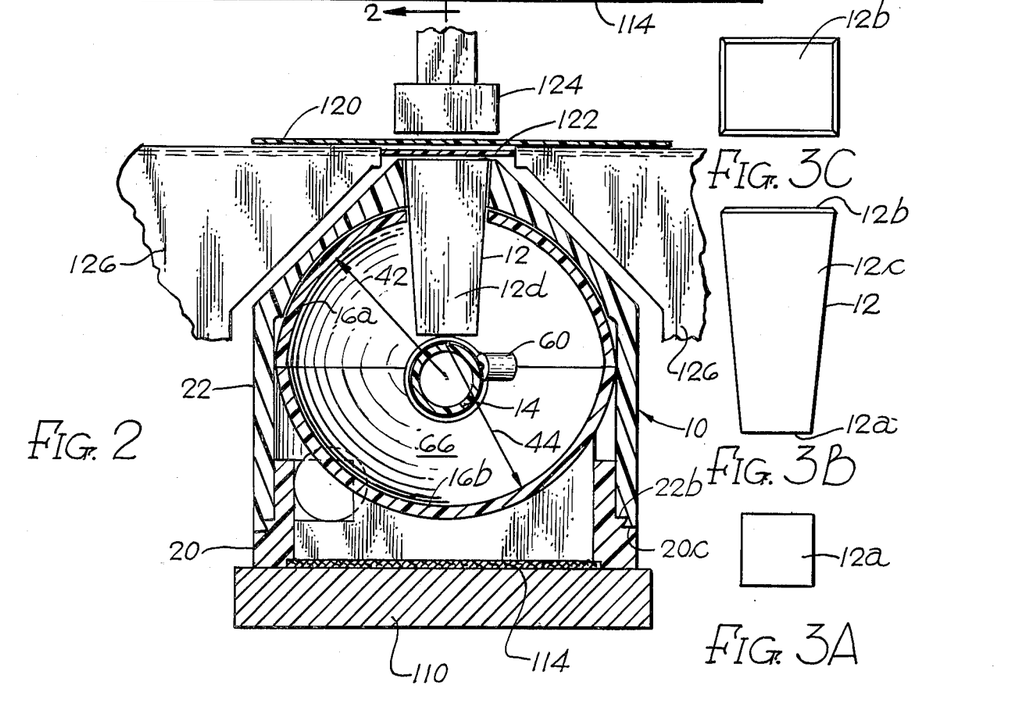
FIG. 2 is a sectional view taken substantially along line 2—2 of FIG. 1.
FIGS. 3A, 3B and 3C are views of the bottom, side and top, respectively, of the energy transmitting body as illustrated in FIGS. 1 and 2.
Figure 4:
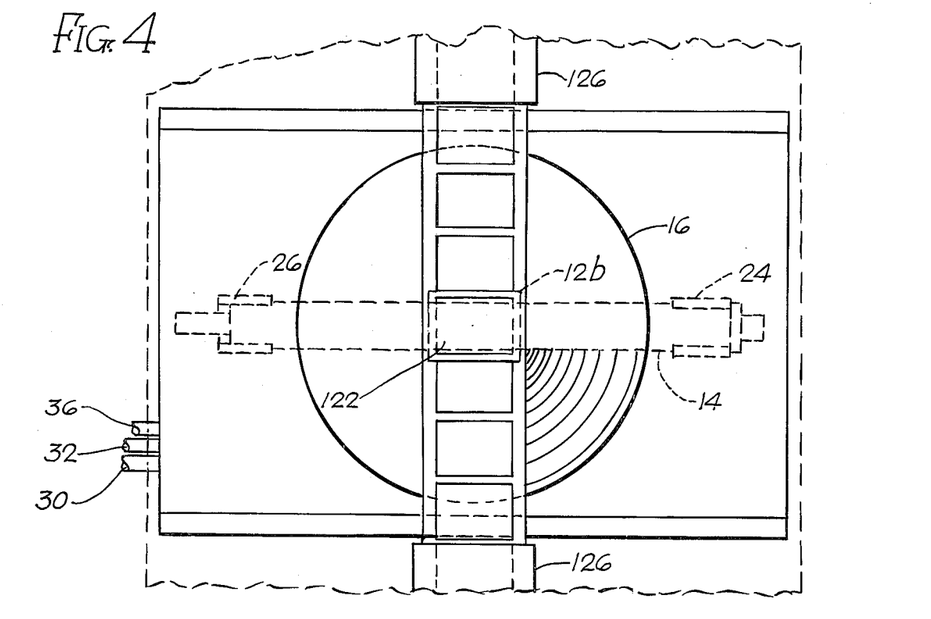
FIG. 4 is a plan view of the embodiment of the device illustrated.
Figure 5:
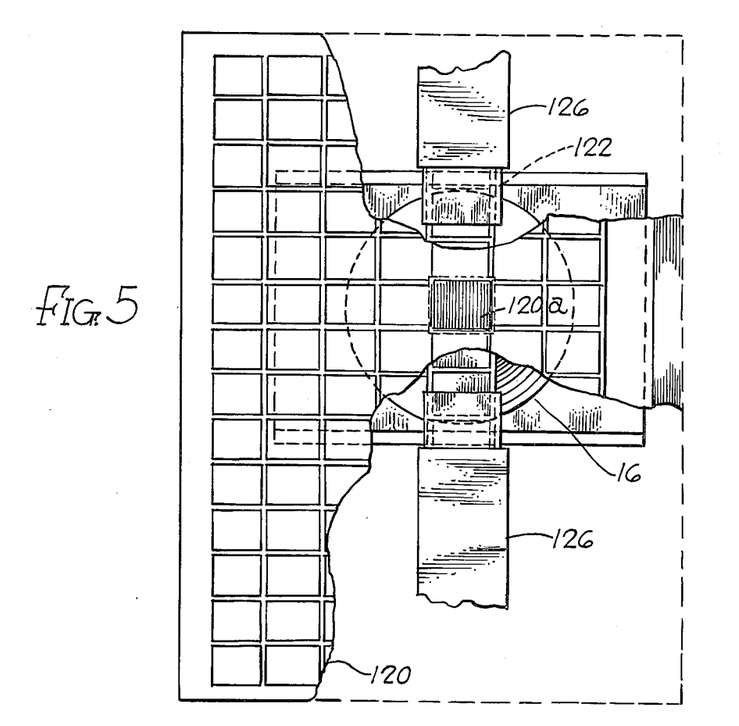
FIG. 5 is a fragmentary, top view showing the imaging mask used in forming an image on an area or zone of a microfiche card in position in relation to the exit facet of the energy transmitting body of the device.

The energy transmitting member 12 advantageously comprises a truncated, or frusto-pyramidal-shaped prism-like element formed of a substantially clear, solid, energy transmitting material. While the member 12 may be fabricated of various materials, it is most advantageously formed of a high purity quartz available commercially under the trade designation Amersil, Grade T-19 Suprasil. The member 12, as shown, has an energy entrance facet 12a, an energy exit facet 12b, and two pairs of inclined side facets 12c—12c and 12d—12d. The entrance facet 12a has side margins which are substantially equal in length, and, therefore, the facet 12a is square in shape. The adjacent side margins of the exit facet 12b are unequal in length, and, therefore, the facet 12b is rectangular in shape. Each of the margins of the exit facet 12b, as shown, is beveled. The entrance facet 12a has a surface area which is less than the surface area of the exit facet 12b, and each of the facets 12a and 12b lies in a plane which is substantially transverse to the longitudinal axis of the member 12 and which is substantially parallel to the plane of the other. The side facets 12c—12c and 12d—12d of the member 12 are each inclined at an angle with relation to the longitudinal axis of the member 12, and each pair of side facets 12c—12c and 12d—12d is inclined at a different angle with relation to said axis than is the other pair.

The surface area of the entrance facet 12a and the exit facet 12b, and the length of the side facets 12c—12c and 12d—12d, and the angles of inclination of the side facets with relation to the longitudinal axis of the member 12 are predetermined to enable energy from the source 14 to be collected, directed, collimated and shaped by the member 12 in a manner to provide maximum utilization and substantially uniform dispersion of the energy at the film plane. By way of illustration, an energy transmitting body having utility in apparatus of the type shown in U.S. Pat. No. 3,966,317 and being capable of meeting the foregoing desiderata would have an entrance facet with side margins approximately 0.354 inch (8.99 mm) in length, and an exit facet having side margins, as measured at the top of the beveled edges of the facet 12b, approximately 0.394 inch (10 mm) wide and 0.492 inch (12.49 mm) long. The length of the member 12 as measured along its longitudinal axis is approximately 0.945 inch (24 mm). The angle of inclination of the narrower, that is, facets 12d—12d, of the two pairs of side facets with relation to the longitudinal axis of the energy transmitting body would be approximately 1 30'55", while the corresponding angle of the wider, that is facets 12c—12c, of the two pairs would be approximately 4 28'39".

The energy source 14 employed in the imaging device of the present invention is similar to the energy source disclosed in U.S. Pat. No. 3,966,317, and comprises a Xenon flash tube such as a Model No. FX255C-.75 manufactured by EG & G Company. The Xenon flash tube has an electrical input of a maximum of about 50 Joules. It desirably is a broad band type of the tube having a range from UV to infrared with wavelengths of about 2000 to about 10000 Angstroms. The ends of the flash tube 14 are supported on spring clips 24 and 26 secured on the base portion 20 of the housing 18. The ends of the flash tube 14 are connected to wire leads 30 and 32 (see FIGS. 6 and 7) through the clips 24 and 26. A trigger or energizing coil 34, connected to a power source by a wire lead 36 through a terminal assembly 40 (see FIG. 20), is positioned on the outer surface of the flash tube 14 for energizing the tube. The terminal assembly 40 will be described in greater detail hereinafter.

The energy intercepting and reflecting means 16 of the imaging device 10 comprises hemispherically-shaped reflectors 16a and 16b each having a different center of curvature as represented by the arrows 42 and 44, respectively. The reflectors 16a and 16b may be formed of any suitable energy reflecting material such as glass mirrors, metal, or plastics. In the embodiment of the invention illustrated, the reflectors 16a and 16b advantageously are formed of a plastics material such as Plexiglas which has been front surface aluminum coated. As shown, the reflector 16a has its center of curvature located on the longitudinal axis of the flash tube 14, while the reflector 16b has its center of curvature located at a point slightly below the center of the entrance facet 12a of the member 12 at the top of the tube 14 and directly above the center of curvature of the reflector 16a (see FIGS. 1 and 2). The radius of each of the reflectors 16a and 16b is of sufficient length to prevent dispersion of the aluminum reflective coating on the surfaces of the reflectors by the high intensity energy emitted by the flash tube 14. In the embodiment of the device 10 illustrated, the radius of each reflector is approximately 0.812 inch (20.6 mm). The centers of curvature of the reflectors are displaced in the manner described to enable reflected energy emitted by the flash tube 14 to pass around the tube 14 into the entrance facet 12a of the member 12. The extent of the displacement in the device 10 is approximately 0.120 inch (3 mm).

Figures 8, 9, 10, 11:
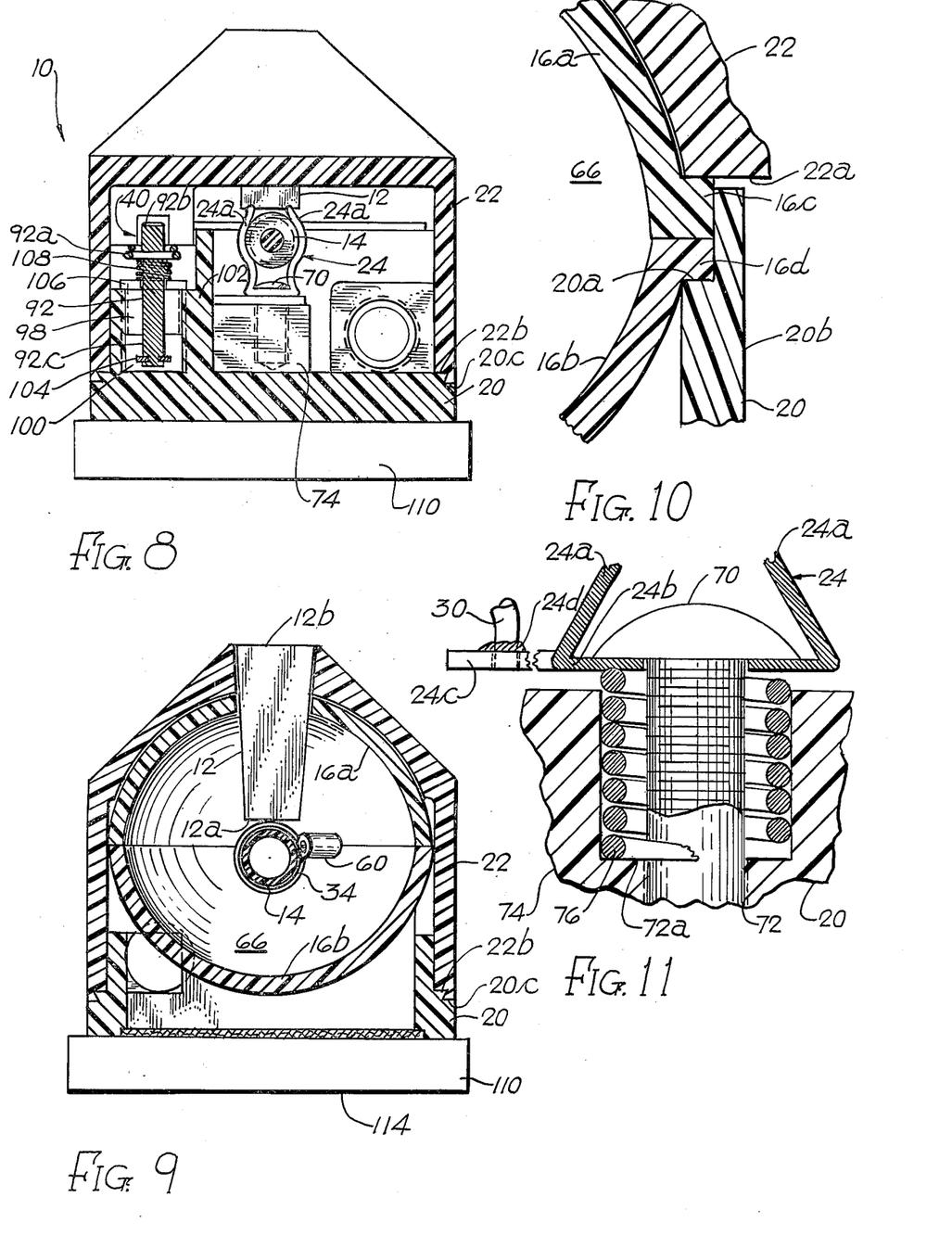
FIG. 8 is a sectional view taken substantially along line 8—8 of FIG. 7.
FIG. 9 is a sectional view taken substantially along line 9—9 of FIG. 7.
FIG. 10 is an enlarged fragmentary sectional view taken substantially along line 10—10 of FIG. 7.
FIG. 11 is an enlarged fragmentary view partly in section of the details of one of the spring clips employed to support an end of the flash tube.
Figure 14:
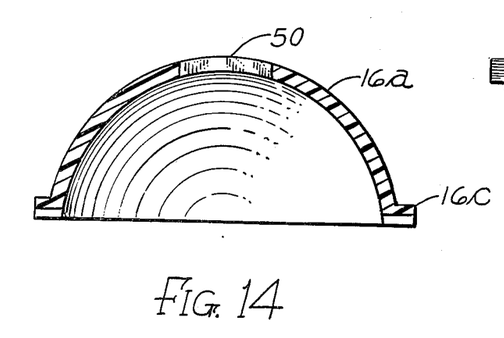
FIG. 14 is a sectional view taken substantially along line 14—14 of FIG. 12.
Figure 15:
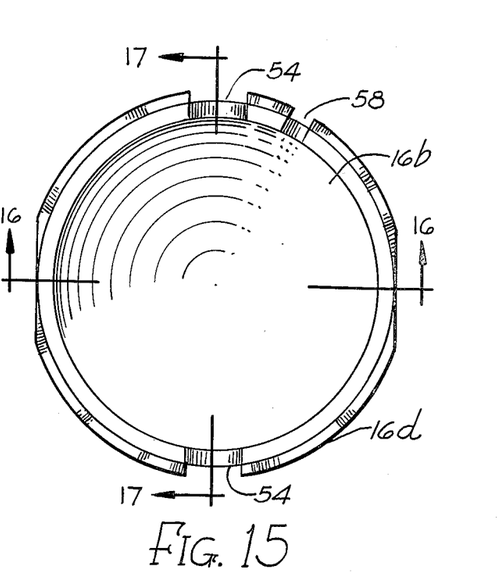
FIG. 15 is a plan view of the lowermost hemispherically-shaped reflector.
Figure 16:
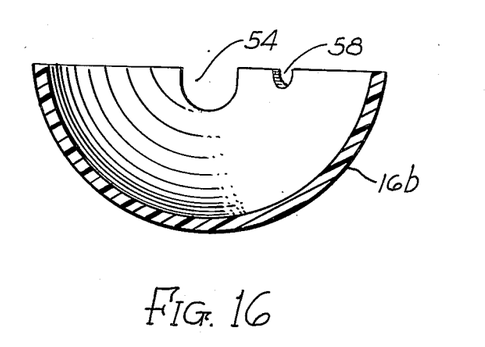
FIG. 16 is a sectional view taken substantially along line 16—16 of FIG. 15.
Figure 17:
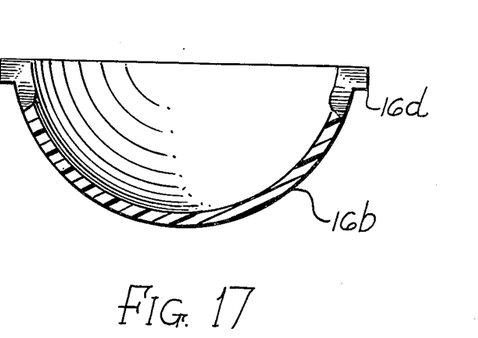
FIG. 17 is a sectional view taken substantially along line 17—17 of FIG. 15.

As best shown in FIGS. 10, 14 and 17, the reflectors 16a and 16b are each provided with an outwardly extending flange 16c and 16d, respectively, along a portion of their free margins. The flanges 16c and 16d are placed in abutting relation with respect to one another, and are maintained in that position by the base portion 20 and the cover portion 22 of the housing 18. More specifically in this connection, the flange 16d of the reflector 16b is positioned on a shoulder 20a formed in a side wall 20b of the base portion 20. The outer margin of the flange 16c of the reflector 16a, in turn, abuts an extension of the side wall 20b, and the free margin 22a of the cover portion 22 overlies the upper margin of the flange 16c and the extension of the wall 20b. The free margins 20c and 22b of the base and cover portions of the housing 18 are notched as shown in FIGS. 8 and 9, and desirably are press-fitted into engagement with respect to one another. Means, such as a slot (not shown), for enabling the portions 20 and 22 of the housing to be wedged apart may be provided along one of both of the margins of the portions 20 and 22.

Figure 12:
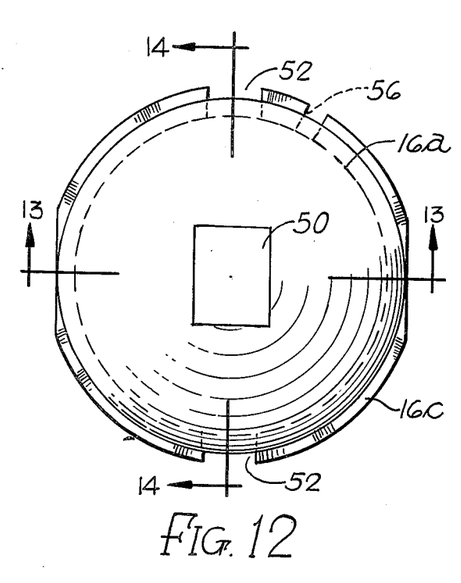
FIG. 12 is a plan view of the uppermost hemispherically-shaped reflector.
Figure 13:
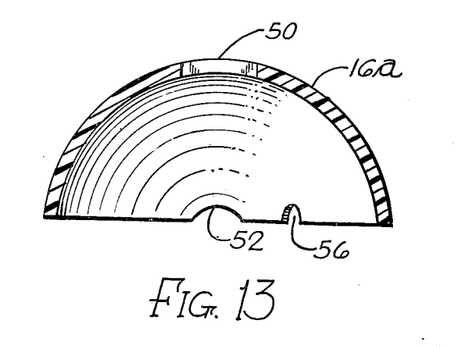
FIG. 13 is a sectional view taken substantially along line 13—13 of FIG. 12.

Still further with reference in particular to FIGS. 12–17, the reflector 16a, as illustrated in FIG. 12, is provided at its poll with a rectangularly shaped opening 50 for receiving the prism-like member 12. In addition, the reflectors 16a and 16b are each provided with diametrically opposed recesses 52 and 54, respectively, along their free margins which, when the reflectors 16a and 16b are positioned in operative relation with respect to one another, are in register with one another. The opening formed by the recesses 52 and 54 is adapted to accommodate the energy source 14. The reflectors 16a and 16b also are provided with registering recesses 56 and 58, respectively, for accommodating an insulator 60 for that portion of the trigger 34 which extends through the reflecting means 16. The reflectors 16a and 16b, when positioned in the housing 18, form an energy collecting and reflecting chamber 66 for the entrance facet 12a of the member 12 and the greater portion of the energy source or tube 14.

Figure 6:
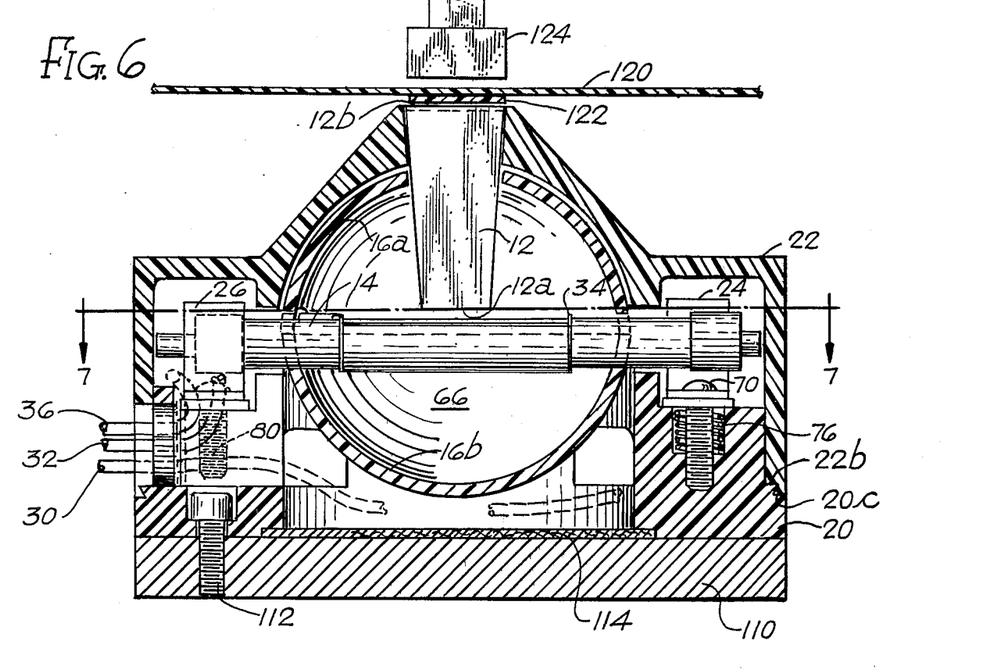
FIG. 6 is a sectional view taken substantially along line 6—6 of FIG. 7.

As stated hereinabove, the ends of the energy source or flash tube 14 are supported on spring clips 24 and 26. As shown in FIGS. 6 and 11, the spring clip 24 comprises a pair of upwardly, extending, curved resilient arms 24a—24a connected at their lower ends by a crosspiece or base 24b. The base 24b has an opening therethrough for receiving a screw 70 which, in turn, is engaged in a threaded opening 72 provided in a boss 74 formed in the base portion 20 of the housing 18. The opening 72 is enlarged at its upper end to receive a spring 76, the upper end of which engages the base 24b of the spring clip 24 and the lower end of which rests on a shoulder 72a formed by the enlargement of the upper end of the opening 72. The arrangement of the spring 76 in relation to the spring clip 24 effectively compensates for any torsional stresses which may be placed on the energy source or flash tube 14 when the flash tube is mounted on the spring clips 24 and 26. Stated differently, the arrangement of the spring 76 in relation to the spring clip 24 enables a certain amount of clockwise or counterclockwise turning to take place to relieve any stress on the flash tube 14 due to possible misalignment, or the like, between the clips 24 and 26. As shown in FIG. 11, one arm 24a of the spring clip 24 has struck from it a lead wire engaging portion 24c. The portion 24c is provided with an opening 24d therethrough for receiving an end of the wire lead 30 which is soldered in place in the opening.

Figure 18:
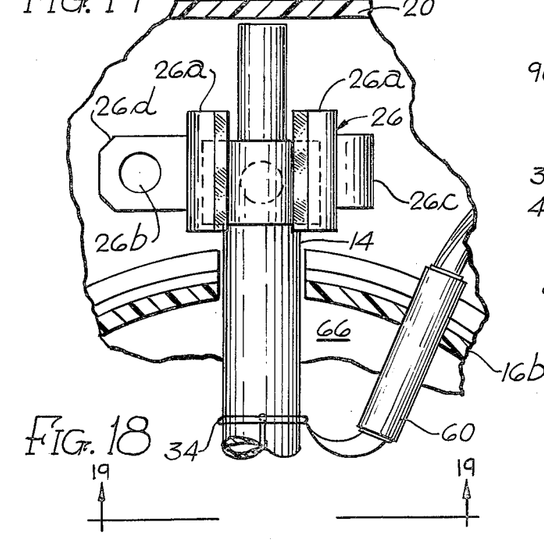
FIG. 18 is an enlarged fragmentary view partly in section showing details of the spring clip employed to support the other end of the flash tube.
Figure 19:
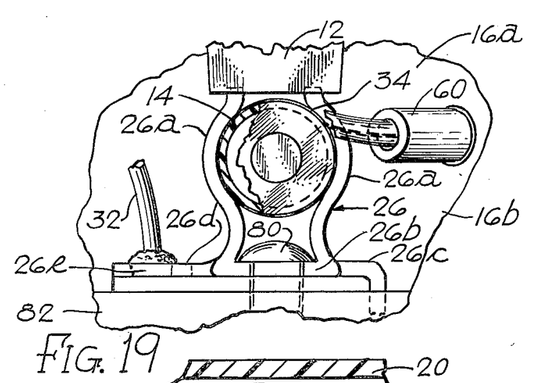
FIG. 19 is a view of the spring clip arrangement shown in FIG. 18 as viewed substantially along line 19—19 of FIG. 18.

The spring clip 26, as shown in FIGS. 18 and 19 of the drawings, like the clip 24, comprises a pair of upwardly extending, curved, resilient arms 26a—26a connected at their lower ends by a crosspiece or base 26b. The base 26b has an opening therethrough for receiving a screw 80 which is engaged in a threaded opening in a boss 82 formed in the base portion 20 of the housing 18. An anchoring portion 26c is struck from one arm 26a of the spring clip 26, and the end of the portion 26c is embedded in the material of the boss 82. The other arm 26a of the spring clip 26 has struck from it a lead engaging portion 26d. The portion 26d is provided with an opening 26e for receiving an end of the wire lead 32 which is soldered in place.

Figure 7:
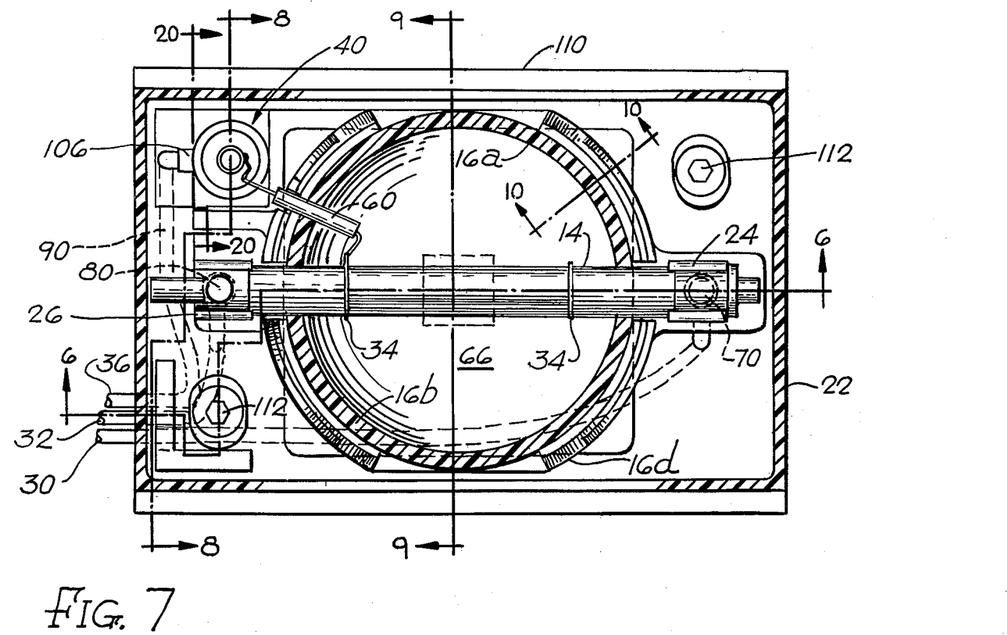
FIG. 7 is a sectional view taken substantially along line 7—7 of FIG. 6.
Figure 20:
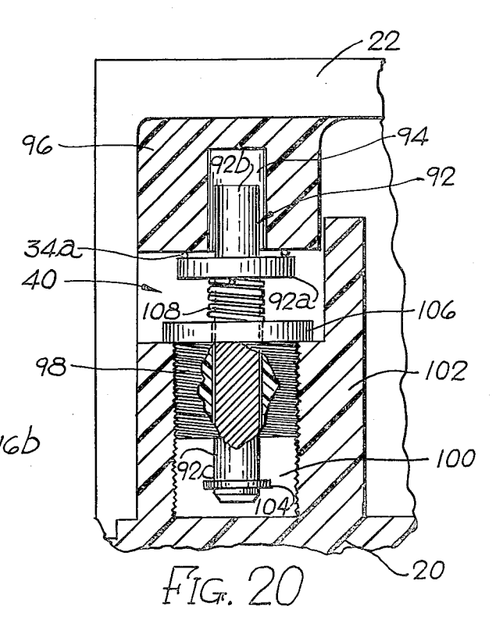
FIG. 20 is an enlarged fragmentary sectional view of the connector means for the flash tube trigger.
Figure 21:
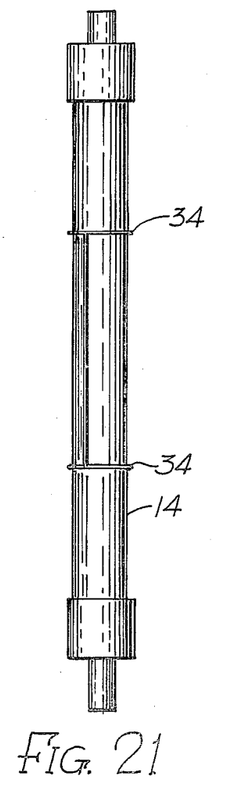
FIG. 21 is a plan view of an embodiment of a flash tube used in the device.

As shown in FIGS. 7, 8 and 20, the trigger 34 is connected to the terminal assembly 40 which, in turn, is connected to the lead wire 36 through which the trigger 34 is energized. The terminal assembly 40, as best seen in FIG. 20, comprises an elongated, substantially cylindrical shaft 92 having an integral annular flange 92a formed thereon below the upper end 92b of the shaft 92. The upper end 92b of the shaft extends into an opening 94 provided in a boss 96 formed in the upper or cover portion 22 of the housing 18. The lower end 92c of the shaft 92 extends through an externally threaded plug 98 positioned in an internally threaded opening 100 formed in a boss 102 on the base portion 20 of the housing 18. An E-ring 104 is secured to the lower end 92c of the shaft 92 to prevent the shaft from being disengaged from the plug 98. An eyelet connector 106, which is attached to the lead wire 36, is engaged on the shaft 92. A spring 108 is positioned on the shaft 92 between the flange 92a and the eyelet connector 106, and acts to urge the flange 92a against a loop 34a of wire formed at one end of the trigger 34 and positioned on the upper end 92b of the shaft 92. This arrangement assures proper electrical contact between the lead wire 36 and the trigger 34, while enabling the ready separation or replacement of the flash tube 14 from the device.

The base portion 20 of the housing 18 desirably is secured to a base plate 110 by means of screws 112—112 (see FIGS. 6 and 7). The plate 110 may be fabricated of a light weight metal such as aluminum. To prevent any electrical discharge between the tube 14 and the metal plate 110, a sheet 114 of an insulating material advantageously is positioned on the plate 110 below the reflector 16b.

As stated above, the imaging device 10 of the present invention is adapted for use in conjunction with apparatus such as is disclosed in U.S. Pat. No. 3,966,317. Thus, as shown in the drawings, a microform, preferably in the form of a microfiche card, having the normal 4×6 inch dimensions and capable of receiving up to 96 microimages at a 24× reduction ratio, desirably is used for imaging with the device. The card comprises a flexible and substantially transparent synthetic plastic substrate such as Mylar (polyethylene glycol terephthalate), for example, having a thickness in the range of from about 3 to 5 mils to about 15 mils. Coated on the substrate, preferably by vacuum deposition, is a thin, continuous solid layer of an energy dispersible image forming material such as bismuth, or a bismuth alloy, having a thickness of from about 1000 A to about 2000 A. The layer of energy dispersible image forming material is heat absorbing, and, in the case of bismuth, has a melting point of about 271° C. A protective overlayer advantageously is applied on the energy dispersible layer. The protective overlayer desirably comprises a substantially transparent synthetic plastic film of Saran, polyurethane, or the like, and has a thickness of about 1 micron.

In utilizing the image device 10 to form an image on an area or zone 120a of the card 120, a microimaged mask film strip 122, such as is described in the aforementioned U.S. patent, is positioned between the exit facet 12b of the member 12 and the area 120a of the card 120. The film strip 122 may be automatically and selectively fed from a pair of cassettes 126—126 (see FIG. 2). The area 120a of the card 120 is brought into contact with the mask film strip 122, and maintained in that position during imaging, by means of a movable plunger 124. In a preferred embodiment, the imaging device 10 may be mounted for reciprocal movment toward and away from the plunger 124 to assure secure positioning of the card 120 and the strip 122 during imaging. The Xenon flash tube 14 thereafter is energized to provide a short pulse of electromagnetic or radiant energy. The short pulse of energy produced by the tube 14 is within the range of about 40 microseconds to about 1 millisecond, preferably about 40 microseconds. Due to the combined high energy collection efficiency of the member 12 and the reflectors 16a and 16b, the flash pulse is approximately 40% to 50% shorter than would be otherwise possible. Concomitantly, the energization of the tube 14 can take place at a lower operating potential. These factors combine to appreciably extend the useful life of the tube 14, enabling up to 100,000, or more, flashes to be obtained from a single Xenon tube of the size described above.

The short pulse of energy emitted by the tube 14 is collected at, and reflected into the entrance facet 12a of the member 12. As the energy passes through the member 12, it is collimated to the greatest extent possible and directed toward the exit facet 12b where it emerges in a shape to provide maximum utilization and optimum distribution of the energy at the film plane. More specifically in this latter connection, the collimated energy emerging from the exit facet 12b of the member 12 is formed or shaped in a manner such that if a grid were placed at the exit facet 12b, the energy would emerge from the grid in the form of tiny inverted cones, the vertical or longitudinal axis of each of which being substantially perpendicular to the surface of the exit facet.

As the energy emerges from the exit facet 12b, it passes through the transparent areas of the microimaged mask to the layer of energy dispersible material on the area or zone 120a of the card 120 where the energy is absorbed. This absorption of the energy by the energy dispersible material at these areas causes the energy dispersible material to become soft or molten, whereupon the continuous solid layer of energy dispersible material at the areas of the zone 120a where the energy is absorbed is broken up and dispersed into small and widely spaced globules to make these areas substantially transparent. The dispersion of the energy dispersible material at the energy absorbing areas is occasioned in the main by the surface tension of the heated material to form such small and widely spaced globules. Again, due to the combined highly efficient energy collecting capabilities of the member 12 and the reflectors 16a and 16b, and the ability of the member 12 to collimate and direct the energy toward the plane of the microfiche card 120, dispersion of the energy dispersible material in the areas thereof where energy absorption occurs, and, therefore, image resolution takes place substantially uniformly over the entire area or zone 120a. As indicated above, after the globules are so formed by the short pulse of energy from the tube 14, they almost instantaneously cool and remain in that globular condition to provide a sharp, high resolution microimage on the card corresponding to the microimage of the mask film strip 122.

While the invention has been illustrated and described in relation to a specific embodiment thereof, it should be understood that various modifications may be made in the device without departing from the spirit and scope of the invention.

What is claimed is:

1. An imaging device for flash imaging, through an imaging mask at an imaging film plane, a dry-process imaging film having a layer of an energy dispersible image forming material on a surface thereof, comprising: an energy source capable of emitting electromagnetic energy of an intensity sufficient to cause dispersion of the energy dispersible image forming material on the imaging film, an imaging mask at the imaging film plane for enabling electromagnetic energy from the energy source to be applied therethrough in a preselected pattern to the imaging film having the layer of an energy dispersible image forming material on a surface thereof, electromagnetic energy collecting means associated with the energy source, said energy collecting means including energy transmitting means adapted to provide a direct path between the energy source and the imaging mask and serving to collect, direct, collimate and shape the energy emitted by the energy source to provide maximum utilization and substantially uniform area distribution of the electromagnetic energy at the imaging film plane, said energy collecting means further including energy intercepting and reflecting means for receiving at least a portion of the energy source and the energy transmitting means and for directing electromagnetic energy from the energy source in the direction of the energy transmitting means, and support means for maintaining the energy transmitting means and the energy intercepting and reflecting means of the energy collecting means in a predetermined position with relation to one another, the energy source, and the imaging mask at the imaging film plane whereby substantially the full intensity of the directed, collimated and shaped electromagnetic energy is applied to the imaging film through the imaging mask to attain rapid and substantially uniform dispersion in a preselected pattern of the energy dispersible image forming material on the imaging film.

2. An imaging device according to claim 1 wherein the energy transmitting means comprises a prism-like solid body having an energy entrance facet positioned adjacent to the electromagnetic energy source and an energy exit facet positioned adjacent to the imaging mask at the imaging film.

3. An imaging device according to claim 1 wherein the entrance facet and the exit facet of the energy transmitting means each lie in a plane substantially parallel to the imaging film plane.

4. An imaging device according to claim 1 wherein said support means includes a housing for receiving the electromagnetic energy source, and resilient retaining members in said housing adapted to releasably receive and support the ends of the electromagnetic energy source, at least one of said resilient members being associated with stress-compensating means positioned transversely to the longitudinal axis of the electromagnetic source for relieving torsional forces on the electromagnetic energy source when the ends thereof are positioned on the resilient members.

5. An imaging device according to claim 4 wherein the resilient members comprise a pair of open-ended metallic clips which are secured at their base to the housing, at least one of said clips being associated with spring means enabling said at least one clip to rotate in a direction to relieve torsional stresses placed on the electromagnetic energy source when the ends thereof are engaged on the clips.

6. An imaging device according to claim 1 wherein triggering means is provided for the electromagnetic energy source, the triggering means being connected to a terminal assembly carried in the support means of the device, said terminal assembly being connected to a power source for energizing the triggering means and comprising movable shaft means for maintaining electrical contact between an end of the triggering means and said power source for the triggering means.

7. An imaging device according to claim 6 wherein shaft guide means is provided for the movable shaft means, said guide means enabling the shaft means to move in a direction to maintain electrical contact between the triggering means and said power source for the triggering means.

8. An imaging device according to claim 6 wherein the shaft means carries a wire lead connected to the power source for the triggering means.

9. An imaging device according to claim 6 wherein a spring is provided for the shaft means for urging the shaft means in the direction of said end of the triggering means.

10. An imaging device for flash imaging, through an imaging mask at an imaging film plane, a dry-process imaging film having a layer of an energy dispersible image forming material on a surface thereof, comprising: an energy source capable of emitting electromagnetic energy of an intensity sufficient to cause dispersion of the energy dispersible image forming material on the imaging film, an imaging mask at the imaging film plane for enabling electromagnetic energy from the energy source to be applied therethrough in a preselected pattern to the imaging film having the layer of an energy dispersible image forming material on a surface thereof, electromagnetic energy collecting means associated with the energy source, said energy collecting means including energy transmitting means for directing, collimating and shaping the energy emitted by the energy source to provide maximum utilization and substantially uniform distribution of the electromagnetic energy at the imaging film plane, said energy collecting means further including a chamber having an energy reflecting inner surface, said chamber encasing at least in part the electromagnetic energy source and the energy transmitting means and serving to intercept and reflect electromagnetic energy from the energy source in the direction of the energy transmitting means, and support means for maintaining the energy transmitting means and the energy intercepting and reflecting means of the energy collecting means in a predetermined position with relation to one another, the energy source, and the imaging mask at the imaging film plane whereby substantially the full intensity of the directed, collimated and shaped electromagnetic energy is applied to the imaging film through the imaging mask to attain rapid and substantially uniform dispersion in a preselected pattern of the energy dispersible imaging forming material on the imaging film.

11. An imaging device according to claim 10 wherein the chamber is formed by a pair of substantially hemispherically shaped members having an inner surface which is energy reflecting, the walls of said members having openings therethrough for receiving the electromagnetic energy source and the energy transmitting means.

12. An imaging device according to claim 11 wherein the hemispherically shaped members each have a different center of curvature.

13. An imaging device according to claim 11 wherein the openings comprise recesses formed in the free margins of the hemispherically shaped members which are in register when said members are positioned in opposed relation to one another.

14. An imaging device for flash imaging, through an imaging mask at an imaging film plane, a dry-process imaging film having a layer of an energy dispersible image forming material on a surface thereof, comprising: an energy source capable of emitting electromagnetic energy of an intensity sufficient to cause dispersion of the energy dispersible image forming material on the imaging film, an imaging mask at the imaging film plane for enabling electromagnetic energy from the energy source to be applied therethrough in a preselected pattern to the imaging film having the layer of an energy dispersible image forming material on a surface thereof, electromagnetic energy collecting means associated with the energy source, said energy collecting means including energy transmitting means for directing, collimating and shaping the energy emitted by the energy source to provide maximum utilization and substantially uniform distribution of the electromagnetic energy at the imaging film plane, said energy collecting means further including energy intercepting and reflecting means for directing electromagnetic energy from the energy source in the direction of the energy transmitting means, and support means including a housing having a bottom portion and a removable cover portion said cover portion having an opening therethrough for enabling electromagnetic energy from the energy source to be applied to an imaging film through the imaging mask, said support means serving to maintain the energy transmitting means and the energy intercepting and reflecting means of the energy collecting means in a predetermined position with relation to one another, the energy source, and the imaging mask at the imaging film plane whereby substantially the full intensity of the directed, collimated and shaped electromagnetic energy is applied to the imaging film through the imaging mask to attain rapid and substantially uniform dispersion in a preselected pattern of the energy dispersible image forming material on the imaging film.

* * * * *